Sept. 4, 1962 C. BELSKY 3,052,459
SPRING SEAT ASSEMBLY
Filed Jan. 19, 1960 3 Sheets-Sheet 1

CHARLES BELSKY
*INVENTOR.*

BY John R. Faulkner
John J. Roethel
ATTORNEYS

Sept. 4, 1962 C. BELSKY 3,052,459
SPRING SEAT ASSEMBLY
Filed Jan. 19, 1960 3 Sheets-Sheet 2

CHARLES BELSKY
INVENTOR

BY John R. Faulkner
John J. Roethel
ATTORNEYS

Sept. 4, 1962 C. BELSKY 3,052,459
SPRING SEAT ASSEMBLY
Filed Jan. 19, 1960 3 Sheets-Sheet 3
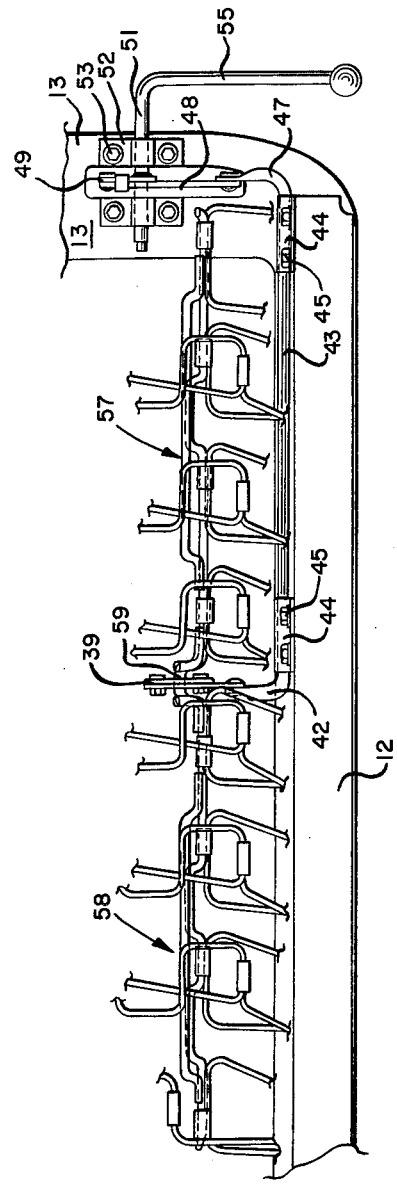
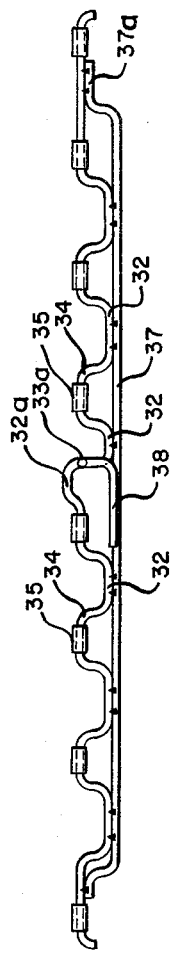
CHARLES BELSKY
*INVENTOR.*
BY John R. Faulkner
John J. Coethel
ATTORNEYS

United States Patent Office 3,052,459
Patented Sept. 4, 1962

3,052,459
SPRING SEAT ASSEMBLY
Charles Belsky, Detroit, Mich., assignor to Ford Motor Company, Dearborn, Mich., a corporation of Delaware
Filed Jan. 19, 1960, Ser. No. 3,407
4 Claims. (Cl. 267—89)

This invention relates generally to a spring seat assembly for motor vehicles, and more particularly to a cushioned seat structure employing formed wire spring elements and incorporating means for adjusting the spring rate.

The front seat of most motor vehicles is supported on a seat adjuster mechanism which permits the seat to be raised or lowered, moved forwardly or rearwardly, and, in some installations, to be tilted at a desired angle. All of these adjustments are provided so that the driver may sat himself behind the vehicle wheel in a position of optimum accessibility to the various operating pedals and steering wheel. Frequently, the same position of the seat will satisfy more than one person using the same vehicle. Because of weight differences, one person will find the seat comfortable, while the other will find it uncomfortable from the standpoint of the seat cushion being either too soft or too hard. Or, on a long trip, the unvarying stiffness of the seat may become tiresome to the driver. Yet, in the conventional seat structure no provision is made for varying the spring rate or stiffness of the seat cushion to accommodate persons in different weight classifications or to permit a change in the spring rate when desired.

It is an object of the present invention to provide a simple mechanism for changing the amount of seat deflection to suit the seat occupant. In general, the present invention embodies a cushion seat structure for a motor vehicle. The cushion seat structure comprises a seat frame having a plurality of laterally spaced wire elements extending between the front and rear rails of the seat frame. A mechanism for controlling the spring rate is provided which comprises a deflection regulator means extending beneath the spring elements. The deflection regulator means is supported for movement between an inoperative and an operative position. An operating means is provided to move the regulator means from the inoperative position to the operative position in which latter position it is engageable by said spring elements after a predetermined initial normal deflection to provide a modified deflection rate for the spring elements.

Other objects and advantages of this invention will be made more apparent as this description proceeds, particularly when considered in connection with the accompanying drawings, wherein:

FIG. 4 is a view illustrating the mounting of the spring regulator means to the springs of the seat cushion assembly; and FIG. 5 is a view in part similar to FIG. 1 illustrating the application of the present invention to a so-called bucket seat construction in which the seats for the vehicle operator and the passenger are separately defined.

Figure 1:
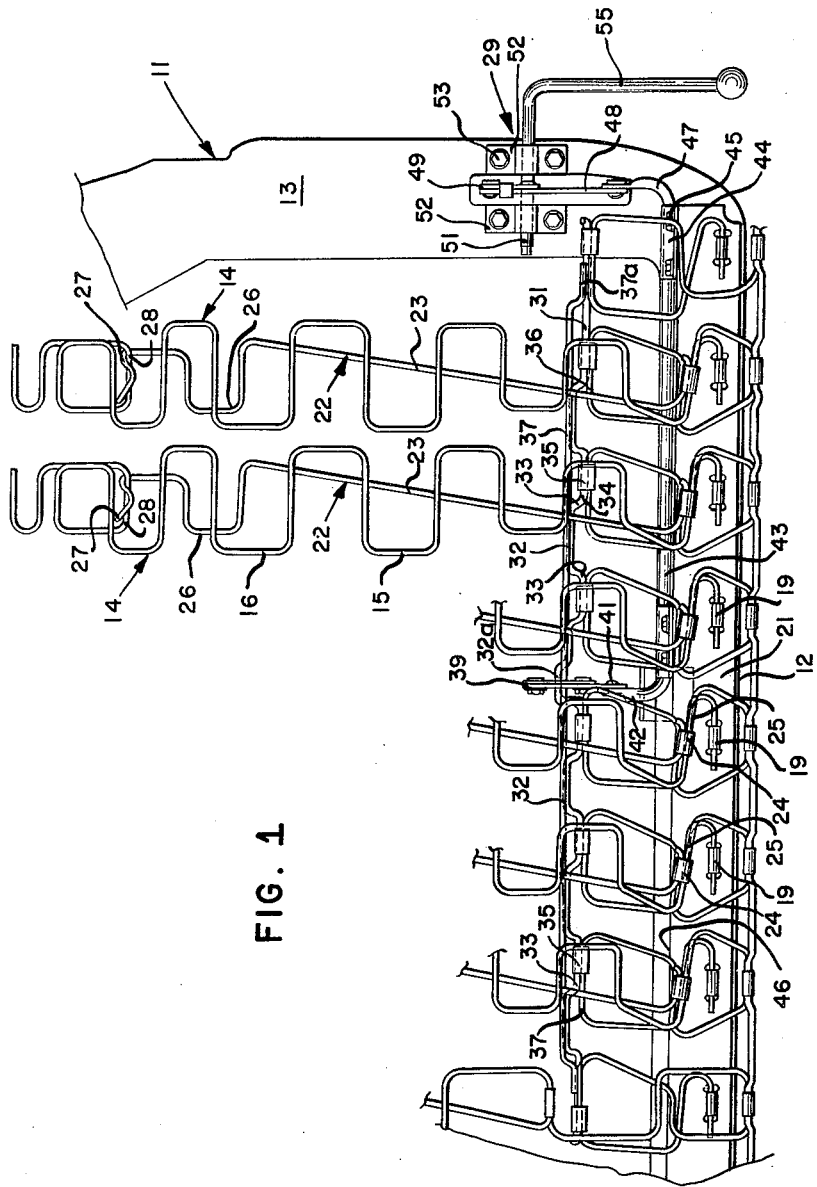
FIG. 1 is a fragmentary plan view of a seat assembly incorporating the present invention.

Referring now to the drawings and particularly to FIGS. 1 to 4, inclusive, the reference character 11 designates generally a front seat assembly frame structure. The seat frame structure 11 is formed of hollow rail sections. Only a portion of the front rail section 12 and the side rail section 13 are shown. A plurality of transversely spaced cushion springs 14 extend longitudinally between the front and rear rails of the seat frame. Each spring unit 14 is made of steel wire formed so that the adjacent loops, such as the loops 15 and 16, are substantially parallel to each other and the spring unit can be longitudinally stretched or compressed under load. Each cushion spring has a crowned seating portion 17 and a generally V-shaped or fishmouth portion 18 at the front end. A similar V-shaped or fishmouth portion (not shown) is also provided at the rear of the spring unit. The ends of each spring unit 14 are suitably connected by spring retainer elements 19 formed in a convenient surface of the front or rear rail, respectively. Each retention device 19 for the front end of the spring units 14 is shown formed in the upper surface 21 of the front rail section 12.

The cushion assembly illustrating the present invention is provided with helper springs 22. Each helper spring 22 has a substantially straight wire section 23 terminating at the front end in a lateral end portion adapted to be clamped by a hog ring 24 to one of the lateral legs 25 of a forwardly located loop 15 of the spring unit 14. The rear end of each helper spring 22 is provided with a formed loop 26 or two allowing for longitudinal stretch or compression of the helper spring. The terminal end 27 of each helper spring 22 rearwardly of the loop 26 is shown twisted around a lateral leg 28 of a rearwardly located loop of the spring unit 14. A hog ring, such as the hog ring 24, may be used to attach the terminal end to the transverse leg or lateral leg portion 28.

The foregoing is substantially in accordance with conventional practice. It will be readily apparent that once the cushion springs, helper springs and seat frame structure have been assembled to form a vehicle seat, nothing can be done to change the characteristics of that particular seat assembly. The cushion springs and helper springs are designed so that the person within an average weight classification will be comfortably and properly supported on the seat. However, even assuming that such a person were seated on the seat, during a long trip the unvarying characteristics of the seat structure would become tiresome.

The structure embodying the present invention provides a means for varying the spring rate so that the deflection of the springs may be decreased to accommodate a person much heavier than the average or so that the driver or seat occupant on long trips can obtain relief from a tiresome condition by changing the spring rate and increasing the stiffness of the front edge of the seat under the knees to obtain additional bolstering effect. The mechanism embodying the present invention comprises a spring regulator unit generally designated 29.

The mechanism 29 comprises a regulator member or wire 31 constructed and arranged to extend transversely across the seat structure 11. That is, the longitudinal axis of the regulator member or wire 31 parallels the front rail 12. The wire 31 (see FIG. 4) is formed with alternately offset or crank section 32, the interconnecting leg portions 33 being substantially normal to the longitudinal axis of the wire. Each of the base sections 34 of the wire 31 are pivotally supported. Preferably, each base section 34 is rotatably clamped by a hog ring 35 to the transverse leg portion 36 forming the apex of the V-shaped or fishmouth portion 18 of the spring unit 14. The regulator wire 31 thus lies below the spring units 14 and their associated helper springs 22.

An auxiliary regulator wire 37 is provided for structural reinforcement. The wire 37 is substantially straight except for a stepped portion 37a at each end, as best seen in FIG. 4. The wire 37 is preferably tack welded to each crank section 32. The stepped portion 37a at each end of the wire 37 is tack welded to an end base section 34 of the wire 31.

One crank section, designated 32a, of the regulator wire 31 is angularly offset with respect to the other crank sections 32. It is structurally reinforced by a right angle wire section or stiffener 38 tack welded to a leg portion 33a of the crank section 32a and the auxiliary regulator wire 37 (see FIGS. 2 and 4).

The crank section 32 is suitably coupled to a link 39. One end of the link 39 is pivotally connected at 41 to the end of a crank arm 42. The crank arm 42 is formed on one end of a shaft or rod 43 which is rotatably journaled in suitable brackets 44 secured by fasteners 45 to the outer face of the longitudinally extending rear wall 46 of the front rail 12. At its outboard end the shaft or rod 43 is provided with a second crank arm 47. The crank arm 47 is connected through toggle links 48 and 49 to a shaft 51. The shaft 51 is journaled in spaced brackets 52 secured by fasteners 53 to the upper face of the wall 54 of the side rail 13. The shaft 51 may be formed to provide a handle portion 55 for manual operation of the regulator mechanism.

Figure 3:
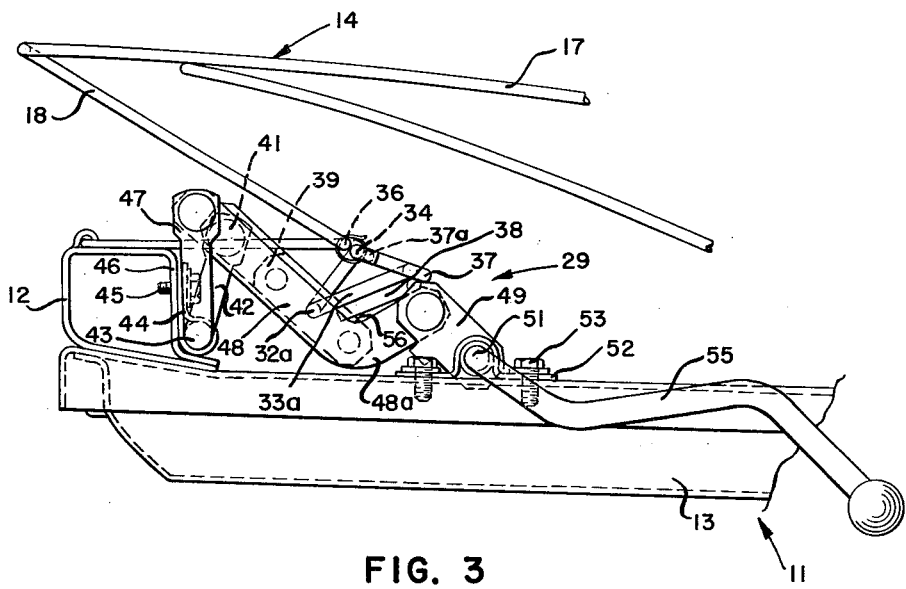
FIG. 3 is a view in part similar to FIG. 2 illustrating the spring rate regulator mechanism in an inoperative position.
Figure 2:
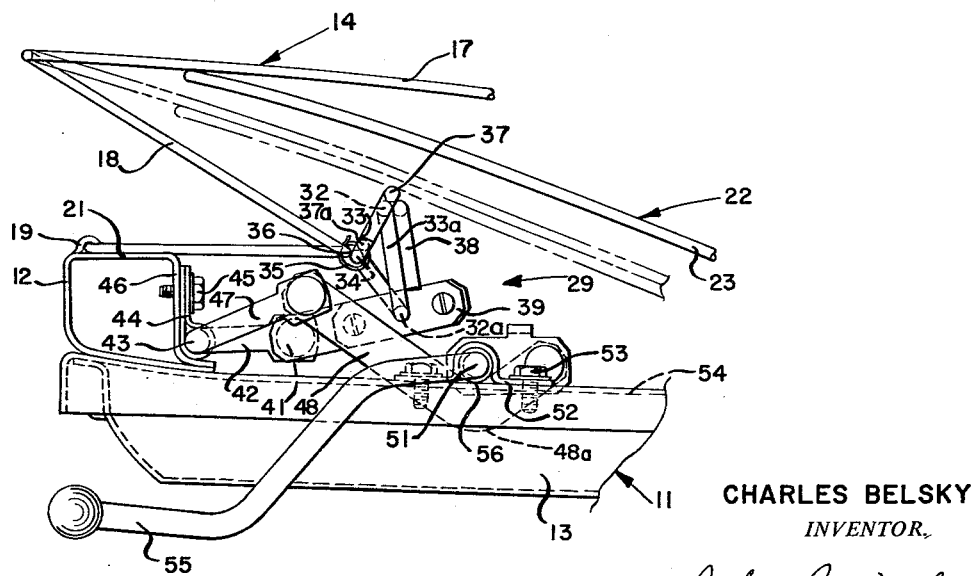
FIG. 2 is a fragmentary side elevational view, in part sectional, illustrating the spring rate regulator mechanism in an operative position.

The operation of the cushion seat spring regulator mechanism embodying the present invention may best be understood with reference to FIG. 3 in which the mechanism is shown in its inoperative position and FIG. 2 in which the mechanism is shown in its operative position. In FIG. 3 the deflection of the cushion springs 14 and their associated helper springs 22 is normal. That is, the deflection occurs as though the mechanism embodying the present invention were not present. Should the seat occupant desire to have a stiffer seat cushion, either to accommodate his heavier weight or to increase the stiffness of the front edge of the seat under the knees to obtain additional bolstering effect, it is only necessary that the operating handle 55 be swung from its rearwardly extending position in a counterclockwise direction through an arc of substantially 180 degrees. Upon completion of its swinging movement, the crank handle 55 then assumes the position illustrated in FIG. 2.

As the swinging movement of the crank handle 55 is started in a counterclockwise direction as viewed in FIG. 3, the toggle joint between the toggle links 48 and 49 is broken with the toggle link 49 swinging in a counterclockwise direction. The toggle link 48 is thus pulled downwardly to a position under the shaft 51. It will be noted that the toggle link 48 is provided with a bend 48a intermediate the ends thereof. As the toggle link 49 is swung to a position in which it starts to swing upwardly with respect to the shaft 51, the bend 48a on the toggle link 48 begins to rise until the inner edge 56 abuts the shaft 51. This, in effect, provides a stop limiting further counterclockwise rotation of the crank handle 55.

As the toggle link 48 is pulled rearwardly and downwardly, it pulls the crank arm in a clockwise direction causing the shaft or rod 43 to be rotated in a clockwise direction. This clockwise rotation is transmitted to the crank arm 42. The crank arm 42 and the link 39 provide a second toggle and as the arm 42 is rotated in a clockwise direction the link 39 is pushed rearwardly, causing the regulator wire, through its crank section 38, to be rotated in a counterclockwise direction, as viewed in FIGS. 2 and 3. This results in the various crank sections 32 of the regulator wire being positioned beneath but in slightly spaced relation to the helper springs 22 of the seat spring assembly.

Thus, as weight is applied to the seat cushion, the spring units 14 and the helper springs 22 will yield in a normal manner for the first few degrees of downward movement. Upon the helper springs reaching the dot dash outline position shown in FIG. 2, the helper springs will abut the crank sections 32. In effect, the free length of the helper springs 22 is changed, that is, made shorter. Thus, the spring is stiffened or, in other words, the spring rate increased. Since the helper springs are coupled to the spring elements 14 the stiffness is transmitted to the latter increasing their spring rate.

The embodiment of the invention illustrated in FIG. 5 shows the principle of the present invention applied to a front seat which is divided into two definite seating areas or, as more popularly known, a front seat having bucket seats for the vehicle operator and the passenger. In this embodiment the regulator wire comprises two similar sections 57 and 58, each similar in construction to the regulator wire of the previously described embodiment. The link 39 is coupled to a crank portion 59 which is a connecting wire or link between the adjacent ends of the two individual sections. Operation of the crank handle 55 causes the regulator wire beneath both bucket seat sections to be simultaneously operated changing the deflection rate of both seat sections.

It will be understood that the invention is not to be limited to the exact construction shown and described, but that various changes and modifications may be made without departing from the spirit and scope of the invention as defined in the appended claims.

What is claimed is:

1. In a cushioned seat structure for motor vehicles comprising a seat frame and a plurality of laterally spaced wire spring elements extending between front and rear rails of the seat frame, a deflection regulator means extending beneath said spring elements, means supporting said regulator means for movement between an inoperative and an operative position in which latter position it is engageable by said spring elements to provide a modified deflection rate therefor, and toggle linkage means operatively connected to said regulator means for controlling the position thereof, said toggle linkage means being constructed and arranged to lock said regulator means in said operative and inoperative positions obviating the use of securing catch devices.

2. In combination with a seat structure having a seat frame and a plurality of laterally spaced formed wire spring elements extending between the front and rear rails of said seat frame, a deflection regulator means for varying the deflection rate of said spring elements, said regulator means comprising a regulator element extending beneath said spring elements in substantially parallel and spaced relationship to said front rail, means swingably supporting said regulator element for movement from an inoperative to an operative position, said regulator element in said latter position being engageable by said spring elements after predetermined normal deflection to provide a modified deflection rate therefor, a control element accessible exteriorly of said seat frame, and toggle linkage means operatively connecting said control element and said regulator means whereby said control element may control the position of said regulator means, said toggle linkage means being constructed and arranged to lock said regulator means in said operative and inoperative positions obviating the use of securing the catch devices.

3. In combination with a seat structure having a seat frame, a plurality of laterally spaced formed wire spring elements extending between opposing rails of said seat frame, helper spring elements coupled to said first mentioned spring elements therebeneath, a deflection regulator means for varying the deflection rate of said spring elements, said regulator means comprising a regulator element extending beneath said spring elements in substantially parallel and spaced relationship to one of said frame rails, means swingably supporting said regulator element for movement from an inoperative to an operative position, said regulator element in said latter position being engageable by said spring elements after predetermined normal deflection to provide a modified deflection rate therefor, a control element accessible exteriorly of said seat frame, and toggle linkage means operatively connecting said control element and said regulator means whereby said control element may control the position of said regulator means, said toggle linkage means being constructed and arranged to lock said regulator means in said operative and inoperative positions obviating the use of securing catch devices.

4. In combination with a seat structure having a seat frame, a plurality of laterally spaced formed wire spring elements extending between front and rear rails of said frame, and helper spring elements coupled to said first mentioned spring elements therebeneath, said first mentioned spring elements being provided with fishmouth portions at the respective front ends thereof; a spring deflection regulator means for varying the deflection rate of said spring elements, said regulator means comprising a regulator element extending beneath said spring elements in substantially parallel and spaced relationship to said front rail, means pivotally supporting said regulator element at the apex of selected ones of said fishmouth portions for movement from an inoperative to an operative position, said regulator element in said operative position underlying said spring elements in position to interfere with the free deflection of said spring elements under load after predetermined initial deflection to modify the deflection rate thereof, and means operative to move said regulator element from said inoperative position to said operative position, said operative means comprising a crankshaft pivotally mounted on said front rail, link means coupling said crankshaft to said regulator element, and a control element accessible exteriorly of said seat frame for actuating said crankshaft to move said regulator element, said operative means being constructed and arranged to lock said regulator means in said operative and inoperative positions obviating the use of securing catch devices.

References Cited in the file of this patent

UNITED STATES PATENTS

| | | |
|---|---|---|
| 2,327,829 | Sternberg et al. | Aug. 24, 1943 |
| 2,657,740 | Daniels et al. | Nov. 3, 1953 |
| 2,818,105 | Herider et al. | Dec. 31, 1957 |
| 2,845,996 | Flint | Aug. 5, 1958 |
| 2,875,818 | Staples et al. | Mar. 3, 1959 |
| 2,893,475 | Fodermaier | July 7, 1959 |